United States Patent [19]
Akai et al.

[11] Patent Number: 4,917,958
[45] Date of Patent: Apr. 17, 1990

[54] METAL COATED CERAMIC COMPOSITION

[75] Inventors: Yoshito Akai, Wakayama; Nobuyuki Konaga, Osaka; Yasunori Arisato, Katano; Yukikazu Moritsu, Nishinomiya, all of Japan

[73] Assignee: Okuno Chemical Industry Co., Ltd., Osaka, Japan

[21] Appl. No.: 158,051

[22] Filed: Feb. 12, 1988

Related U.S. Application Data

[63] Continuation of Ser. No. 813,194, Dec. 24, 1985, abandoned.

[30] Foreign Application Priority Data

Dec. 12, 1984 [JP] Japan ................................. 59-279028

[51] Int. Cl.$^4$ ........................ B32B 15/04; C03C 27/02
[52] U.S. Cl. ..................................... 428/457; 65/59.4; 65/59.5; 65/32.4; 65/60.2; 156/89; 427/376.2; 428/901; 501/56; 501/66; 501/96
[58] Field of Search ...................... 65/60.1, 60.2, 60.4, 65/60.8, 32.2, 32.5, 59.21, 59.22, 59.5; 501/56, 65, 66, 96, 97; 428/446, 450, 457, 901; 156/89; 427/376.2

[56] References Cited

U.S. PATENT DOCUMENTS

| | | | |
|---|---|---|---|
| 4,004,937 | 1/1977 | Masaki et al. | 501/97 |
| 4,097,295 | 6/1978 | Chyung et al. | 501/56 |
| 4,379,852 | 4/1983 | Watanabe et al. | 501/93 X |
| 4,384,909 | 5/1983 | Layden | 156/89 |

Primary Examiner—Robert L. Lindsay
Attorney, Agent, or Firm—Armstrong, Nikaido Marmelstein, Kubovcik & Muray

[57] ABSTRACT

This invention provides a glass composition for joining ceramic articles to ceramic or metallic articles, the composition comprising:

(i) about 100 parts by weight of at least one of TiN, TiB$_2$, AlN, AlB$_2$, BN, B$_4$C, SiC and Si$_3$N$_4$ powders, (ii) about 20 to about 1600 parts by weight of SiO$_2$ powder, (iii) about 1 to about 600 parts by weight of B$_2$O$_3$ powder, and (iv) about 1 to about 1600 parts by weight of at least one of powders of (R$^1$)$_2$O wherein R$^1$ is Na, K or Li, (R$^2$)O wherein R$^2$ is Mg, Ca, Ba, Zn, Pb or Cd, (R$^3$)O$_2$ wherein R$^3$ is Ti, Zr or Mn, and (R$^4$)$_2$O$_3$ wherein R$^4$ is Al or Bi.

5 Claims, No Drawings

METAL COATED CERAMIC COMPOSITION

This application is a continuation of application Ser. No. 813,194 filed 12/24/85, now abandoned.

This invention relates to vitreous ceramic compositions for joining a ceramic article to a ceramic or metallic article.

As the development of ceramic materials have advanced in recent years, ceramics have found wide use in various fields as in manufacture of electronic components, tools, machine parts, building materials, household articles, etc. With the progress of ceramic technologies, it has become essential to improve secondary processing techniques such as the method of uniting ceramic products with ceramic or metallic products in order to use ceramic materials for more extensive purposes.

Conventional methods for joining ceramic articles to ceramic or metallic articles include (1) a method using an organic adhesive, (2) a method using a vitreous enamel as an adhesive and (3) a method involving bonding by melting at a high temperature.

However, these methods have drawbacks. For example, the method (1) is employed to join together articles usable only at or below about 200° to about 300° C.; the method (2) is used for sticking oxide ceramic products to oxide ceramic or metallic products and produces a joint having a low bonding strength and exhibiting a markedly reduced bonding strength at or above about 300° C.; and the method (3) suffers a limited use because it tends to deform the ceramic or metallic products in bonding by melting. Attempts have been made to plate a ceramic body with metal, thereby rendering the ceramic body electroconductive so that the body finds a broader range of applications. This method, however, makes a weak joint between the ceramic substrate and the metallic coat and thus has not been put to practical use.

It is an object of this invention to provide an adhesive for joining ceramic articles to ceramic or metallic articles to render the united articles usable at an elevated temperatures and a method for the joining.

It is another object of the invention to provide an adhesive for joining an article of nonoxide ceramics as well as an article of oxide ceramics to an article of any ceramics or metallic article and a method for the joining.

It is a further object of the invention to provide an adhesive for joining a ceramic article to a ceramic or metallic article without causing deformation of the united articles and a method for the joining.

Other objects and features of the invention will become apparent from the following description.

We conducted extensive research and found that when interposing a vitreous ceramic composition having a specific formulation between the adherents, followed by heat treatment, the bonded articles are imparted a high bonding strength at the joint and there is little or no reduction of bonding strength when heated to a high temperature of about 400° to about 1,000° C. The method can bond adherends which are not limited to those of oxide ceramics but include those of nonoxide ceramics, affording an improved bonding strength to the united adherents. Our further discovery was that a metallic coat is firmly bonded to a ceramic body when applied over the vitreous ceramic composition deposited by heat treatment on the ceramic body.

This invention provides a vitreous ceramic composition for joining ceramic articles to ceramic or metallic articles, the composition comprising:
 (i) about 100 parts by weight of at least one of $TiN$, $TiB_2$, $AlN$, $AlB_2$, $BN$, $B_4C$, $SiC$ and $Si_3N_4$ powders,
 (ii) about 20 to about 1600 parts by weight of $SiO_2$ powder,
 (iii) about 1 to about 600 parts by weight of $B_2O_3$ powder, and
 (iv) about 1 to about 1600 parts by weight of at least one of powders of $(R^1)_2O$ wherein $R^1$ is Na, K or Li, $(R^2)O$ wherein $R^2$ is Mg, Ca, Ba, Zn, Pb or Cd, $(R^3)O_2$ wherein $R^3$ is Ti, Zr or Mn, and $(R^4)_2O_3$ wherein $R^4$ is Al or Bi.

It is critical in this invention to incorporate at least one of $TiN$, $TiB_2$, $AlN$, $AlB_2$, $BN$, $B_4C$, $SiC$ and $Si_3N_4$ powders into the vitreous ceramic composition. Such vitreous ceramic composition can be used for uniting a ceramic product with a nonoxide ceramic product as well as with an oxide ceramic or metallic product, producing a strong joint. When a ceramic substrate is coated with the vitreous composition and the coated substrate is heated, the vitreous ceramic composition becomes interspersed with small masses of the aforesaid nonoxide particles so that when metal is deposited over the substrate, a significant improvement in bonding strength is achieved at a joint between the metallic coat and the substrate.

The vitreous composition of this invention critically contains about 20 to about 1600 parts by weight of component (ii), about 1 to about 600 parts by weight of component (iii), and about 1 to about 1600 parts by weight of component (iv), per 100 parts by weight of component (i). If lesser amounts of these components are present, the application of heat fails to vitrify the glass composition or produces a joint of markedly reduced bonding strength. The components used in excess results in unduly impaired bonding strength, hence undesirable.

Preferred ratios of the components are about 40 to about 800 parts by weight of component (ii), about 3 to about 200 parts by weight of component (iii), and about 10 to about 500 parts by weight of component (iv), per 100 parts by weight of component (i).

The components of the vitreous ceramic composition according to the invention can be any of those commercially available. Although the components are not specifically limited in producing process, particle size and purity, preferred components are those having a high purity to enhance the bonding strength and ranging from about 0.1 to about 100 μm in particle size.

The processes for preparing the vitreous ceramic composition of this invention are not critically limited. The vitreous ceramic composition can be prepared, for example, by merely mixing together the components by a mixer, mill or like means, or by mixing two or more suitable components, heating the mixture to about 700° to about 1600° C. for about 10 to about 20 minutes to obtain a melt, crushing the cooled mass to a particle size of about 0.1 to about 100 μm by a ball mill or the like and mixing the powder with the other components.

To join a ceramic article to a ceramic or metallic article, the vitreous ceramic composition of the invention is first applied to one of ceramic and metallic articles to be united. The methods of application are not specifically restricted and include:

(i) a method in which the vitreous ceramic composition is applied directly to the article, (ii) a method in which the vitreous ceramic composition is applied by thermal spraying to the article, (iii) a method in which a dispersion of the vitreous ceramic composition in a solvent such as alcohol, acetone or the like is sprayed over the article, and (iv) a method in which the ceramic or metallic article is immersed in a dispersion of the vitreous ceramic composition in an organic vehicle or the dispersion is applied to the article by brushing, screen printing, spraying or the like.

Examples of useful organic vehicles are solutions of ethyl cellulose acrylic resin or like organic polymer compound in isopropyl alcohol, pine oil, butylcarbitol acetate or like organic solvent. The application is carried out using preferably about 0.005 to about 2 g/cm$^2$ of the vitreous composition.

Subsequently, the other adherent is brought into contact with the vitreous ceramic composition of this invention, and is heated at a temperature of about 500 to about 1500° C. for about 3 to about 60 minutes. The atmosphere for heating is not specifically limited and may be any of atmospheres of air, nitrogen, hydrogen, argon or the like.

There is no specific restriction on the properties of ceramic and metallic articles to which the vitreous ceramic composition of this invention can be applied insofar as the articles have a heat resistance in terms of at least 500° C. The shapes of suitable ceramic and metallic articles are not specifically limited and can be any of powders, rods, plates, shaped bodies and the like. Examples of ceramic articles adequate for use of the vitreous ceramic composition of the invention are those of conventional ceramics such as tiles, portland cements, bricks, roof tiles, pottery and enamelled containers; oxide ceramics such as alumina, zirconia, beryllia, mullite, forsterite, cordierite, magnesia, ferrite, zinc oxide, tin oxide, lead titanate, barium titanate and PZT; and nonoxide ceramics such as silicon nitride, silicon carbide, boron nitride, aluminum nitride, boron carbide, tungsten carbide, titanium nitride, thallium carbide, calcium carbide, titanium boride, lanthanum boride, CaSi$_2$, MnSi$_2$, calcium fluoride and calcium sulfate. Examples of metallic articles for use of the vitreous ceramic composition are those of iron, copper, nickel, stainless steel, titanium alloy, copper alloy and like metals and ordinary alloys; carbon-silicon steel, chrome steel, nickel steel, manganese steel, tungsten-carbide alloy, titanium-carbide alloy, molybdenum alloy (e.g. Mo-Ag, Mo-Cu, etc.) and like sintered metal alloys produced by powder metallurgy; etc.

The vitreous ceramic composition of this invention can be used also for adhering a metallic deposit to a ceramic body. In bonding these adherent, the vitreous ceramic composition of the invention is applied to the ceramic body and the coated body is heat-treated. The application and heating may be performed in the same manner as in uniting ceramic bodies with ceramic or metallic bodies. When the body thus heat-treated was cooled to room temperature, metal is deposited on the coat of vitreous ceramic composition by a usual method. The application of metallic deposit can be effected, for example, by electrodeless plating with nickel or copper after treatment with a catalyst or vacuum plating such as vapor deposition and sputtering. A thick metallic layer may be further formed by electroplating over the surface of the metallic coat. Also an electroconductive metal may be adhered to the metallic coat by soldering or brazing.

When used for joining ceramic articles to ceramic or metallic articles, the vitreous ceramic compositions of this invention can achieve the following remarkable results.

(1) A strong joint is produced between the ceramic article and the ceramic or metallic article and the joint strength is reduced to a far lesser extent when the assembly is heated to a high temperature of about 400° to about 1000° C.

(2) The vitreous ceramic composition can be used for both bodies of oxide ceramics and those of nonoxide ceramics.

(3) The vitreous ceramic composition can bond a metallic deposit to a ceramic article to obtain a strong joint.

(4) The heating can be conducted at a wide temperature range of about 500° to about 1500° C.

The vitreous ceramic composition of the invention has the foregoing outstanding properties and thus can be used in an extensive range of fields. For example, the composition can be used for:

(a) adhering a metallic article or a different type of ceramic article to a tile, cement and the like to make building materials, (b) joining a metallic part to an enamelled container to produce a household article, (c) uniting a metallic component of high strength with a non-corrosive ceramic component low in thermal conductivity and high in wear resistance to prepare a tool, (d) sticking an outer metallic part to an inner ceramic part in producing a cylinder or like parts for a rotary pump, (e) joining a ceramic part to an engine body in a ceramic engine, (f) adhering a ceramic part to a copper board to produce a printed board for large current flow, and (g) connecting a metallic deposit to a ceramic part to prepare an IC ceramic board, a printer part, an electrode on a ceramic article or the like.

This invention will be described below in more detail with reference to Examples and Comparison Examples.

EXAMPLE 1

To a plate of sintered 96% alumina (3×3×1 cm) was applied a vitreous ceramic composition comprising 100 parts by weight of TiN powder about 20 μm in particle size, 600 parts by weight of SiO$_2$ powder about 5 μm in particle size, 30 parts by weight of B$_2$O$_3$ powder about 5 μm in particle size, 100 parts by weight of CaO powder about 5 μm in particle size, 20 parts by weight of TiO$_2$ powder about 10 μm in particle size and 30 parts by weight of Al$_2$O$_3$ powder about 10 μm in particle size in a ratio of 0.2 g/cm$^2$. To the coated plate was joined a rod of sintered zirconia 1 cm in diameter at a right angle to the plate by application of heat at 880° C. for 25 minutes. The bonding strength of the joints was measured by vertically pulling the rods off the plates with one set of the specimens maintained at 25° C. and the other at 450° C. to determine the strength required for separation. Table 1 below shows the results.

EXAMPLE 2

Over a plate of sintered stainless steel alloy (3×3×1 cm) was applied by thermal spraying a vitreous ceramic composition comprising 100 parts by weight of TiB$_2$ powder about 50 μm in particle size, 160 parts by weight of $SiO_2$ powder about 20 μm in particle size, 40 parts by weight of $B_2O_3$ powder about 10 μm in particle size, 20 parts by weight of $Na_2O$ powder about 20 μm in particle size, 12 parts by weight of BaO powder about 20 μm in particle size, 60 parts by weight of PbO powder about 15 μm in particle size and 12 parts by weight of $Bi_2O_3$ powder 20 μm in particle size in a ratio of 1 g/cm². A rod of sintered silicon nitride 1 cm in diameter was joined to the coated plate at a right angle to the plate by application of heat at 670° C. for 10 minutes. The bonding strength was measured in the same manner as in Example 1 with the results shown below in Table 1.

EXAMPLE 3

In a crucible of platinum was placed a mixture of 75 parts by weight of $SiO_2$ powder about 1 μm in particle size, 20 parts by weight of $B_2O_3$ powder about 0.5 μm in particle size, 17.5 parts by weight of $Li_2O$ powder about 0.5 μm in particle size, 7.5 parts by weight of MgO powder about 1 μm in particle size, 12.5 parts by weight of PbO powder about 1 μm in particle size and 10 parts by weight of $ZrO_2$ powder about 3 μm in particle size. The mixture was heated in the crucible at 1300° C. for 30 minutes to obtain a melt. The melt was cooled and crushed by a ball mill to a particle size of 5 to 30 μm. The powder was mixed with 100 parts by weight of AlN powder about 10 μm in particle size to obtain the vitreous ceramic composition of this invention. Eighty parts by weight of the glass composition was added to a solvent mixture of 10 parts by weight of methanol and 10 parts by weight of isopropyl alcohol. The mixture was subjected to mechanical agitation and sprayed over a plate of sintered 96% alumina (3×3×1 cm) to deposit 0.5 g/cm² of the glass composition. A rod of copper 1 cm in diameter was joined to the plate at a right angle to the plate by application of heat in nitrogen gas at 600° C. for 5 minutes. The bonding strength was measured in the same manner as in Example 1 with the results indicated below in Table 1.

EXAMPLE 4

Twenty parts by weight of an organic vehicle comprising 70% by weight of ethyl cellulose and 30% by weight of pine oil was fully mixed with 80 parts by weight of the vitreous ceramic composition of this invention comprising 100 parts by weight of BN powder about 5 μm in particle size, 100 parts by weight of $SiO_2$ powder about 5 μm in particle size, 7 parts by weight of $B_2O_3$ powder about 3 μm in particle size, 10 parts by weight of $K_2O$ powder about 5 μm in particle size, 3 parts by weight of ZnO powder about 1 μm in particle size, 3 parts by weight of $MnO_2$ powder about 10 μm in particle size and 4 parts by weight of $Al_2O_3$ powder about 3 μm in particle size. The mixture was applied to a plate of sintered silicon carbide (3×3×1 cm) by brushing to deposit 0.1 g/cm² of the vitreous ceramic composition of the invention. A rod of sintered silicon carbide 1 cm in diameter was joined to the coated plate at a right angle to the plate by application of heat at 920° C. for 40 minutes. The bonding strength obtained in the same manner as in Example 1 is shown below in Table 1.

EXAMPLE 5

In a crucible of platinum was placed a vitreous ceramic composition comprising 100 parts by weight of SiC powder about 60 μm in particle size, 186 parts by weight of $SiO_2$ powder about 20 μm in particle size, 6 parts by weight of $B_2O_3$ powder about 25 μm in particle size, 14 parts by weight of $ZrO_2$ powder about 5 μm in particle size, and 20 parts by weight of $Al_2O_3$ powder about 10 μm in particle size. The composition was heated at 1500° C. in the crucible for 45 minutes to obtain a melt. The melt was cooled and crushed by a ball mill to a particle size of 10 to 100 μm. The powder was applied to a body of sintered silicon carbide (3×3×1 cm) in a ratio of 0.03 g/cm² and the coated body was heated at 1200° C. for 5 minutes. The body was cooled to room temperature and electrolessly plated with copper by the following method.

(i) Degreasing: The body was immersed in alcohol for 5 minutes.

(ii) Catalyzing: The body was immersed in a sensitizer solution at 25° C. for 3 minutes and washed with water and also immersed in an activator solution at 25° C. for 2 minutes and washed with water. The sensitizer solution used was an aqueous solution of a sensitizer (trademark "TMP Sensitizer," product of Okuno Chemical Industry Co., Ltd., Japan) in a concentration of 100 ml/l and the activator solution used was an aqueous solution of an activator (trademark "TMP Activator," product of Okuno Chemical Industry Co., Ltd.) in a concentration of 100 ml/l.

(iii) Electroless nickel plating: The body was immersed in an aqueous solution of a composition for electrodelessly nickel plating (trademark "Topnicolon EL-70," product of Okuno Chemical Industry Co., Ltd.) in a concentration of 400 ml/l at 90° C. for 30 minutes.

After the body was electrodelessly plated with nickel, rods of steel 1 cm in diameter were each adhered to the plates at a right angle to the plates by a braze welding at 850° C. and vertically pulled off the plates with one set of the specimens maintained at 25° C. and the other at 450° C. to obtain the bonding strength by determining the strength required for separation of the nickel coat from the plate of sintered silicon carbide. Table 1 below shows the results.

EXAMPLE 6

In a crucible of platinum was placed a mixture of 139 parts by weight of $SiO_2$ powder about 30 μm in particle size, 28 parts by weight of $B_2O_3$ powder about 10 μm in particle size, 14 parts by weight of CdO powder about 10 μm in particle size, 8 parts by weight of $TiO_2$ powder about 20 μm in particle size, and 28 parts by weight of $Bi_2O_3$ powder about 5 μm in particle size. The mixture was heated to 1450° C. in the crucible for 30 minutes to obtain a melt. The melt was cooled and crushed by a ball mill to a particle size of 1 to 10 μm. To the powder were added 66 parts by weight of $Si_3N_4$ powder, 17 parts by weight of $AlB_2$ powder and 17 parts by weight of $B_4C$ powder, all having a particle size of 1 to 10 μm to obtain a vitreous ceramic composition. One hundred parts by weight of the vitreous ceramic composition was mixed with 19 parts by weight of an organic vehicle comprising 85% by weight of ethyl cellulose and 15% by weight of pine oil. The mixture was passed 3 times through a 3-roll mixer and subjected to screen printing with a 150 mesh screen to deposit 0.02 g/cm² of the composition of the invention over one planar surface of a body of sintered silicon niride (5×5×1 cm). After preheating at 150° C. for 5 minutes, the plate was heated to 900° C. for 5 minutes. Tin was applied in an amount of 0.003 g/cm$^2$ by vapor deposition to the body coated with the vitreous ceramic composition to form circular deposits 1 cm in diameter at 4 positions of the body and then the body was dipped in a solution of a composition for electrodelessly nickel plating (trademark "Niclad 741," product of Okuno Chemical Industry, Co., Ltd.) at 60° C. for 60 minutes to form a nickel coat over the tin deposit. The bonding strength of the joint between the sintered body and the nickel coat was measured by the method described above in Example 5 with the results shown below in Table 1.

EXAMPLE 7

The procedure of Example 6 was repeated using the same mixture of organic vehicle and vitreous ceramic composition and subjecting a plate of alumina (5×5×0.1 cm) to screen printing using a 200 mesh screen to deposit 0.008 g/cm$^2$ of the glass composition of the invention. The printed plate was preheated at 150° C. for 10 minutes and heated to 870° C. for 20 minutes. The plate was cooled to room temperature, immersed in a solution of a catalyst for electroless plating (trademark "CCP-4230," product of Okuno Chemical Industry Co., Ltd.) at 25° C. for 5 minutes, and heated at 200° C. for 10 minutes. The plate was cooled to room temperature and dipped in a solution of a composition for electrodelessly copper plating (trademark "OPC Copper," product of Okuno Chemical Industry Co., Ltd.) at 55° C. for 30 minutes to form a copper coat. The plate was electroplated with copper to produce a copper coat having a thickness of 40 μm. To the surface of the copper-coated plate was applied a masking ink (trademark "Topresist G," product of Okuno Chemical Industry, Co., Ltd.) by screen printing to form square deposits (2×2 mm) at five positions, and the printed surface was irradiated with ultraviolet light for 10 seconds to harden the masking ink. The specimen thus obtained was immersed in an aqueous solution of ferric chloride at 50° C. to dissolve the copper-coated portion as distinct from the masked portion of the specimen. The specimen was then dipped in a solution of methylene chloride to remove the masking ink. The bonding strength of the joint betweeen the remaining copper coat and the plate was measured in the same manner as in Example 5 with the results shown below in Table 1.

COMPARISON EXAMPLE 1

The same procedure as in Example 1 was repeated except that the vitreous ceramic composition used in Example 1 but not containing TiN was employed. The bonding strength of the joint between the rod of zirconia and the plate of alumina was measured with the results shown below in Table 1.

COMPARISON EXAMPLE 2

The same procedure as in Example 2 was repeated except that the vitreous ceramic composition used in Example 2 but not containing TiB$_2$ was employed. The bonding strength of the joint between the plate of sintered stainless steel alloy and the rod of silicon nitride was measured with the results shown below in Table 1.

COMPARISON EXAMPLE 3

The same procedure as in Example 3 was repeated except that the vitreous ceramic composition used in Example 3 but not containing AlN was employed. The bonding strength of the joint between the rod of copper and the plate of alumina was measured with the results shown below in Table 1.

COMPARISON EXAMPLE 4

The same procedure as in Example 4 was repeated except that the vitreous ceramic composition used in Example 4 but not containing BN was employed. The bonding strength of the joint between the body of sintered silicon carbide and the rod of silicon carbide was measured with the results shown below in Table 1.

COMPARISON EXAMPLE 5

The same procedure as in Example 5 was repeated except that the vitreous ceramic composition used in Example 5 but not containing SiC was employed. The bonding strength of the joint between the copper coat and the body of sintered silicon carbide was measured with the results shown below in Table 1.

COMPARISON EXAMPLE 6

The same procedure as in Example 5 was repeated with the exception of not using the vitreous ceramic composition used in Example 5. The bonding strength of the joint between the body of sintered silicon carbide and the copper coat was measured with the results shown below in Table 1.

COMPARISON EXAMPLE 7

The same procedure as in Example 6 was repeated except that the vitreous ceramic composition used in Example 6 but not containing Si$_3$N$_4$, AlB$_2$ and B$_4$C was employed. The bonding strength of the joint between the body of sintered silicon nitride and the nickel coat was measured with the results shown below in Table 1.

COMPARISON EXAMPLE 8

The same procedure as in Example 6 was repeated although without applying to the body of sintered silicon nitride the composition comprising the vitreous ceramic composition and the organic vehicle by screen printing. The bonding strength of the joint between the body of sintered silicon nitride and the nickel coat was measured with the results shown below in Table 1.

COMPARISON EXAMPLE 9

The same procedure as in Example 7 was repeated except that the vitreous ceramic composition used in Example 6 but not containing Si$_3$N$_4$, AlB$_2$ and B$_4$C was employed. The bonding strength of the joint between the alumina plate and the copper coat was measured with the results shown below in Table 1.

COMPARISON EXAMPLE 10

The same procedure as in Example 7 was repeated although without applying the composition comprising the vitreous ceramic composition and the organic vehicle to the alumina plate by printing. The bonding strength of the joint between the alumina plate and the copper coat was measured with the results shown below in Table 1.

TABLE 1

|  | Bonding strength (kg/cm$^2$) | |
| --- | --- | --- |
|  | Measured at 25° C. | Measured at 450° C. |
| Example 1 | 450 | 430 |
| "2 | 380 | 350 |
| "3 | 350 | 350 |
| "4 | 470 | 450 |

TABLE 1-continued

| | Bonding strength (kg/cm$^2$) | |
|---|---|---|
| | Measured at 25° C. | Measured at 450° C. |
| "5 | 380 | 350 |
| "6 | 350 | 330 |
| "7 | 450 | 500 |
| Comp. Example | | |
| 1 | 320 | 120 |
| 2 | 180 | 100 |
| 3 | 300 | 100 |
| 4 | 170 | 70 |
| 5 | 120 | <50 |
| 6 | <50 | <50 |
| 7 | 200 | 120 |
| 8 | 160 | 100 |
| 9 | 150 | 100 |
| 10 | <50 | <50 |

Table 1 reveals that when the vitreous ceramic composition of this invention was used, joints of high bonding strength were produced which exhibited the bonding strength reduced in a lesser degree at high temperatures, and that the joints made in Comparison Examples were afforded an exceedingly decreased bonding strength at 450° C. even when having a high bonding strength at 25°.

We claim:

1. A vitreous ceramic composition for forming an electroconductive metal plating layer on a ceramic article, the composition comprising:
   (i) about 100 parts by weight of at least one compound selected from the group consisting of AlN, BN and Si$_3$N$_4$ powders,
   (ii) about 40 to about 800 parts by weight of SiO$_2$ powder,
   (iii) about 3 to about 200 parts by weight of B$_2$O$_3$ powder, and
   (iv) about 10 to about 500 parts by weight of at least one compound selected from the group consisting of CaO, and Al$_2$O$_3$;
   said composition being applied to the surface of the ceramic article and heated at a temperature of about 500° to about 1500° C. to form a vitreous coating layer to form the vitreous coating layer upon which is applied a metal plating layer.

2. A process for forming an electroconductive metal plating layer on a ceramic article, the process consisting essentially of the steps of:
   applying to the surface of the ceramic article a vitreous ceramic composition comprising:
   (i) about 100 parts by weight of at least one compound selected from the group consisting of AlN, BN and Si$_3$N$_4$ powders,
   (ii) about 40 to about 800 parts by weight of SiO$_2$ powder,
   (iii) about 3 to about 200 parts by weight of B$_2$O$_3$ powder, and
   (iv) about 10 to about 500 parts by weight of at lest one compound selected from the group consisting of CaO, and Al$_2$O$_3$,
   heating the ceramic article at a temperature of about 500° to about 1500° C. to form a vitreous coating layer, and
   plating the vitreous coating layer with an electroconductive metal.

3. A process as defined in claim 2 wherein the ceramic article is one made of oxide ceramics.

4. A process as defined in claim 2 wherein the ceramic article is one made of nonoxide ceramics.

5. A process as defined in claim 2 wherein the ceramic article is at least one of tiles, portland cements, bricks, roof tiles, pottery and enamelled containers.

* * * * *

UNITED STATES PATENT AND TRADEMARK OFFICE
CERTIFICATE OF CORRECTION

PATENT NO. : 4,917,958
DATED : April 17, 1990
INVENTOR(S) : AKAI et al

It is certified that error appears in the above-identified patent and that said Letters Patent is hereby corrected as shown below:

On the cover page, Item [30], "Dec. 12, 1984" should read --Dec. 28, 1984--.

Signed and Sealed this

Fifth Day of November, 1991

Attest:

HARRY F. MANBECK, JR.

*Attesting Officer*     *Commissioner of Patents and Trademarks*